United States Patent [19]

Young et al.

[11] 4,016,028

[45] Apr. 5, 1977

[54] MULTIPLE EFFECT PROCESSES OF CONCENTRATING SOLUTIONS

[75] Inventors: Walter L. Young; C. J. Douglas; Carl A. Connally; Robert L. Cheek, all of Tulsa, Okla.

[73] Assignee: Ozark-Mahoning Company, Tulsa, Okla.

[22] Filed: Apr. 28, 1975

[21] Appl. No.: 572,274

Related U.S. Application Data

[62] Division of Ser. No. 443,339, Dec. 19, 1970, Pat. No. 3,956,061.

[52] U.S. Cl. .................. 159/48 L; 159/16 A; 159/2 MS; 159/4 VM; 159/17 VS; 159/46; 159/4 CC

[51] Int. Cl.² .................. B01D 1/16; B01D 3/06; B01D 1/00

[58] Field of Search ............ 159/2 MS, 3, 46, 47 R, 159/4 K, 17 VS, 47 WL, 4 VMS, 16 R, 4 MS, 4 A, 48 L, 31, 4 CC, 16 A; 202/173, 174; 203/49, 100, 100.2 C; 261/151; 62/305, 314

[56] References Cited

UNITED STATES PATENTS

| | | | |
|---|---|---|---|
| 1,799,478 | 4/1931 | Peebles | 159/2 MS |
| 2,459,302 | 1/1949 | Aronson | 159/2 MS |
| 2,557,204 | 6/1951 | Richardson | 159/4 K |
| 3,285,834 | 11/1966 | Guerrieri et al. | 159/17 VS |
| 3,476,654 | 11/1969 | Sieder | 159/2 MS X |
| 3,489,652 | 1/1970 | Williamson | 202/173 |
| 3,595,757 | 7/1971 | Izumi | 159/2 MS |

*Primary Examiner*—Jack Sofer
*Attorney, Agent, or Firm*—Thomas M. Scofield

[57] ABSTRACT

Improvements in the concentration of solutions in processes involving heating the solution to be concentrated; processes of solution concentrating where the solution to be concentrated is heated prior to concentration by either direct or indirect heat exchange, including particular concentrating processes where the heating means and media include: (1) high pressure steam; (2) low-pressure steam and (3) submerged combustion; Improved methods of vapor-liquid phase separation in solution concentrating processes with the vapor phase utilized as supplemental heating medium to the solution to be concentrated; incorporation of a counterflow gas-liquid contact stage (cooling tower) as one phase in processes of concentrating heated solutions.

5 Claims, 4 Drawing Figures

MULTIPLE EFFECT PROCESSES OF CONCENTRATING SOLUTIONS

This is a division of application Ser. No. 443,339 filed 12/19/74 now U.S. Pat. No. 3,956,061.

BRIEF SUMMARY OF THE INVENTION

This invention is directed to means and methods for most efficiently concentrating solutions. The solutions may or may not have included solids therewithin or precipitate solids through the process of concentration. The processes involved are all directed to improvements in concentrating methods which involve applying heat to the solution to be concentrated in such a way that a vapor-liquid phase separation may be made. Additionally, each of the specific processes employs as a specific concentrating step the passing of the heated, at least partly already concentrated solution, to the overhead distributor of a counterflow gas-liquid contactor of the cooling tower type. Particular improvements involve the use of the vapor phase separated from the heated solution to be concentrated as part of the heating medium applied to the incoming feed and recycle solution. The basic heat input to the solution to be concentrated may be from high pressure steam, low pressure steam or submerged combustion. Thus the basic heating of the solution to be concentrated may be by indirect or direct heat exchange, or both. Means for removing solids from the concentrated solution may be provided prior to removal of the product and recycle of a portion of the ultimately concentrated solution stream.

The solution concentrating process using high pressure steam as the basic heat source to heat the solution involves first passing the solution to be concentrated through a series of indirect heat exchange heating steps while the solution is held under sufficient back pressure to maintain same in liquid form. This heated solution is then passed through a series of flash vaporization or vapor-liquid separation steps. The ultimately concentrated liquid from the last of these steps is passed as overhead liquid feed to the liquid distributor in a counterflow gas-liquid contact device of the cooling tower type. The vapor phase overhead from the liquid-vapor separation steps are used to initially heat the incoming solution in a plurality of the heating steps therefor. Part of the concentrated liquid bottoms from the cooling tower are passed out of the system as product, while part, typically, are recycled through heat exchangers to raise the temperature of the solution.

In the process of concentrating a solution which uses low pressure steam as a basic heat source to heat the solution, the solution is passed through a series of indirect heat exchanging steps to raise the temperature while the solution to be concentrated is maintained under sufficient back pressure that it is in liquid form. The heated solution is then passed to a flash evaporation step to provide a liquid-vapor phase separation. The liquid phase from the flashing step is passed to an evaporative cooling step wherein it is distributed in counterflow relationship with ambient air in a cooling tower. The vapor phase from the flash evaporation step is passed in indirect heat exchange with the solution to be concentrated in one of the indirect heat exchange heating steps thereof. A portion of the liquid bottoms from the cooling tower is passed from the system as the concentrated product. A portion of the liquid bottoms from the cooling tower is recycled through the system. There is additionally provided a water heater of counterflow liquid-gas direct heat exchange, the heated water or liquid from which is also used to heat the new feed input and recycle solution. The hot gases or vapors used in this water heater are supplied from the overhead effluent from the cooling tower and the condensed vapor from the flash evaporated heated solution is also added to the hot water supply for the first heating step.

In the high pressure steam system, three-quarter of the concentration takes place in the vapor-liquid separation steps and about one-quarter in the cooling tower. To the contrary in the low pressure steam system. Therein, about one-quarter of the concentration takes place in the vapor-liquid flashing step and approximately three-quarters of the concentration in the cooling tower.

In the process utilizing submerged combustion to heat the solution to be concentrated, the initial liquid-vapor phase separation takes place in the vessel or vessels directly connected with the submerged combustion evaporator or burner. The once-concentrated liquid bottoms therefrom are passed as the overhead liquid feed input to the liquid distributor of a counterflow gas-liquid contactor of the cooling tower type. The vapor phase from the submerged combustion evaporation vessel or vessels and the vapor phase overhead from the cooling tower are employed in a countefflow vapor-liquid water heater, the liquid bottoms of which are employed to heat the input feed of the solution to be concentrated.

OBJECTS OF THE INVENTION

A first object of the invention is to provide improved methods of and apparatus for concentrating solutions.

Another object of the invention is to provide improved methods of concentrating solutions where high pressure steam is available as a source of heat to the solution to be concentrated.

Another object of the invention is to provide improved methods of and apparatus for concentrating solutions where only low pressure steam is available for heating the solution to be concentrated.

Another object of the invention is to provide improved methods of concentrating solutions wherein the source of heat to the solution to be concentrated is a submerged combustion evaporator, as well as apparatus therefor.

Another object of the invention is to provide improved methods of utilizing a cooling tower as a concentrating step in processes of concentrating liquid wherein the heated, already partly concentrated liquid from earlier process stages is supplied to a counterflow cooling tower for a final concentrating step in direct gas-liquid contact with ambient air.

Another object of the invention is to provide an improved process of concentrating liquids wherein a submerged combustion evaporator is used as an early step in heating the solution to be concentrated and a cooling tower is used as a later step in concentrating the heated, already partly concentrated liquid to be concentrated further, the vapor overheads from the evaporative step using the submerged combustion evaporator and the cooling tower being used as heating media in the process of concentration.

Another object of the invention is to provide an improved process for concentrating solutions of various sorts wherein low pressure steam is the available heat source, the process utilizing a plurality of stages of heating the solution to be concentrated, the last such heating step steam heated, the next to last heating step heated by the vapor overhead from a flash separation of the heated solution, the first heating step a liquid-liquid heating step heated by the liquid bottoms from a water heater, the liquid bottoms from the flash step being further concentrated by liquid-gas counterflow contact in a cooling tower, the vapor overhead from the cooling tower being one source of heat to the water heater, the liquid bottoms from the cooling tower being the concentrated product.

Another object of the invention is to provide an improved process of concentrating solutions wherein the heat source is high pressure steam utilizing a plurality of separate heating steps of the solution to be concentrated followed by a plurality of flashing steps, the ultimate liquid bottoms from the last flashing step being finally concentrated in a counterflow cooling tower with the bottoms from the cooling tower being concentrated product, the overheads from the flashing steps being used to heat a plurality of the initial heating steps of the solution to be concentrated.

Other and further objects of the invention will appear in the course of the following description thereof. In the drawings, which form a part of the instant specification and are to be read in conjunction therewith, several process embodiments of the invention are shown.

FIG. 1

Figure 1:
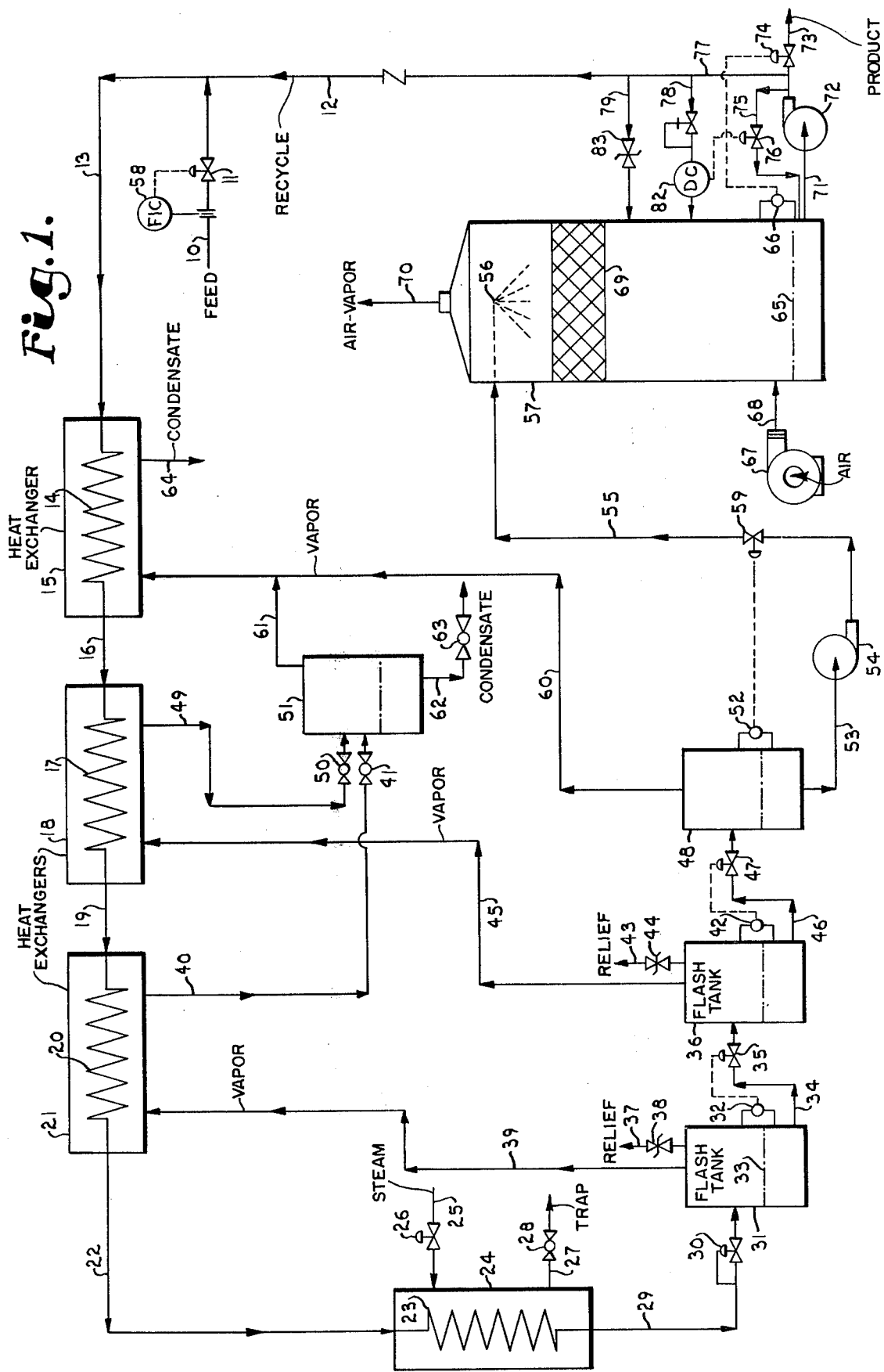
FIG. 1 is a schematic flow diagram of a process for concentrating solutions utilizing high pressure steam as the basic heat source to heat the solution to be concentrated.

Referring to FIG. 1, into feed inlet line 10 there is passed a sodium disilicate stream (to be concentrated) at a temperature of (specific example) 60° F, pressure of 239 P.S.I.G., the stream constituting water in the amount of 26,678 pounds per hour and sodium disilicate in the amount of 5,464 pounds per hour for a total of 32,142 pounds per hour. Line 10 has thereon flow control valve 11 linked with a flow controller 58. This feed stream, as described, is joined by recycle line 12 carrying bottoms from the air blown cooler (also to be described). The stream in recycle line 12 has a temperature of 174° F at a pressure of 241 P.S.I.G.. This stream is in the amount of 139,018 pounds per hour, made up of 76,460 pounds of water per hour and 62,558 pounds of sodium disilicate per hour. Thus the recycle stream in line 12 joining the feed inlet through line 10 has a high concentration of sodium disilicate therein (the concentration of the final output product which is taken from the cooling tower bottoms, as will be described.

From the juncture of lines 10 and 12, there passes line 13. In line 13, then, the stream is at a temperature of 147° F at 234 P.S.I.G., the total flow being 171,160 pounds per hour, made up of 103,138 pounds per hour of water and 68,022 pounds per hour of sodium disilicate.

Line 13 passes into the heat exchange coil 14 of first steam condenser 15, thereafter exiting from condenser 15 as line 16. Line 16 passes to the heat exchanger coil 17 of second steam condenser 18. The exit line 19 from condenser 18 passes to the heat exchange coil 20 of the third steam condenser 21. Exit line 22 from condenser 21 passes to the heat exchange coil 23 of still another steam condenser 24 (the fourth). Condensers 15, 18, 21 and 24 are all indirect vapor-liquid heat exchangers.

Steam inlet line 25 passes high pressure steam at 366° F and 150 P.S.I.G. through steam supply control valve 26 into condenser 24. This steam is supplied in the amount of 9,500 pounds per hour, 452 ACFM. Condensate return line 27 exits from condenser 24, passing through condensate trap 28.

Effluent line 29 exiting from the fourth steam condenser 24 carries the now heated sodium disilicate liquid to be concentrated at a temperature of 350° F, 150 P.S.I.G.. This liquid remains in the total quantity of 171,160 pounds per hour comprising 103,138 pounds per hour of water and 68,022 pounds of sodium disilicate. Thereafter, this liquid is passed through back pressure control valve 30 into a first flash tank 31. Sufficient back pressure is maintained by valve 30 that the solution to be concentrated in lines 13–29 inclusive is in liquid phase.

Flash tank 31 has level controller 32 maintaining a liquid level therein as at 33. Liquid bottoms are passed from tank 31 through line 34 and level control valve 35 to second flash tank 36. Emergency relief line 37 with pressure relief valve 38 is provided. The overhead through line 39 from first flash tank 31 is steam at 300° F, 52 P.S.I.G. and in the quantity of 6,391 pounds per hour. The liquid bottoms passed through line 34 to second flash tank 36 are at 300° F and 52 P.S.I.G. in the total quantity of 164,769 pounds per hour, this makeup being 96,747 pounds of water and 68,022 pounds per hour of sodium disilicate.

The steam in overhead line 39 passes to third steam condenser 21 in indirect heat exchange with the contents of coil 20, effluent condensate from third condenser 21 being passed via line 40 through steam trap 41 to vapor-liquid separator 51 to be described.

Second flash tank 36 has level controller 42 and emergency release line 43 with pressure relief valve 44 thereon. The overhead from second tank 36 through line 45 is steam in the amount of 5,837 pounds per hour at 250° F, 15 P.S.I.G.. Liquid bottoms from second flash tank 36 pass through line 46 and level control valve 47 to third flash tank 48. The liquid in line 46 is in the quantity of 158,932 pounds per hour, more concentrated, 90,910 pounds of water per hour and 68,022 pounds per hour of sodium disilicate at 250° F and 15 P.S.I.G..

The overhead steam from second flash tank 36 through line 45 passes to the second steam condenser 18 in indirect heat exchange with the contents of coil 17 therein. The effluent heat exchange medium from second condenser 18 exits through line 49 and steam trap 50 to vapor-liquid separator 51.

The third flash tank 48 has level controller 52 thereon coupled to level control valve 59. Liquid bottoms from flash tank 48 are passed through line 53, driven by pump 54, passing thereafter through line 55 to the distributor head 56 of an air-blown cooler or cooling tower 57. The liquid in line 55 is in a total quantity of 155,141 pounds per hour, this made up of 87,119 pounds of water and 68,022 pounds of sodium disilicate per hour at 215° F and 18.5 P.S.I.G..

The overhead from the third flash tank passes through line 60 to the first steam condenser 15 and in indirect heat exchange with the contents of coil 14 therein. The steam in line 60 is in the quantity of 3,791 pounds per hour at 215° F and 0 P.S.I.G.. Line 60 is joined by line 61 overhead from the fourth flash tank 51, the contents of this line comprising 772 pounds of steam per hour at 212° F, 0 P.S.I.G.. Bottoms from fourth flash tank 51 pass through line 62 and condensate drainer 63 to the condensate system. The effluent line from steam condenser 15 at 64 also passes to the condensate system.

Turning to the air-blown cooler 57, this is illustrated as a counterflow, forced draft, blow-through cooling tower having a sump 65 regulated by level controller 66 (coupled with valve 74) and having a centrifugal blower or propeller fan 67 supplying air thereto through line 68 above the liquid level in the sump and below the fill 69 of the cooler, if such is employed. Air typically enters the tower at 68 at 80° F, two inches W. C., the air at 7,783 pounds per hour, 1,777 ACFM, including water in the quantity of 86 pounds per hour at 31 ACFM.

The overhead gaseous effluent from air-blown cooler 57 passes from the system as vapor at 175° F in a total quantity of 11,764 pounds per hour, 3784 ACFM. This is made up of air in the quantity of 7,697 pounds per hour, 2,037 ACFM and water in the quantity of 4,067 pounds per hour at 1,747 ACFM (through overhead line 70).

Liquid bottoms are removed from the sump 65 through line 71 driven by recycle pump 72. From pump 72, there passes product outlet line 73 controlled by product flow control valve 74. A first recycle line 75 returning to the sump is controlled by recycle control valve 76. A main process recycle line 77 returns to the system as previously described as line 12.

The condition of the product in line 73 comprises a liquid flow at 174° F, 50 P.S.I.G., typically in the total amount of 12,142 pounds per hour, water 6,678 pounds per hour and 5,464 pounds per hour of sodium disilicate.

On line 77 there may be provided measuring and relief lines 78 and 79 returning to air blown cooler 57. On line 78 there is provided throttle valve 80 for the densometer flow and the density sensor 82. On line 79 there is provided pressure relief valve 83.

FIG. 2

Figure 2:
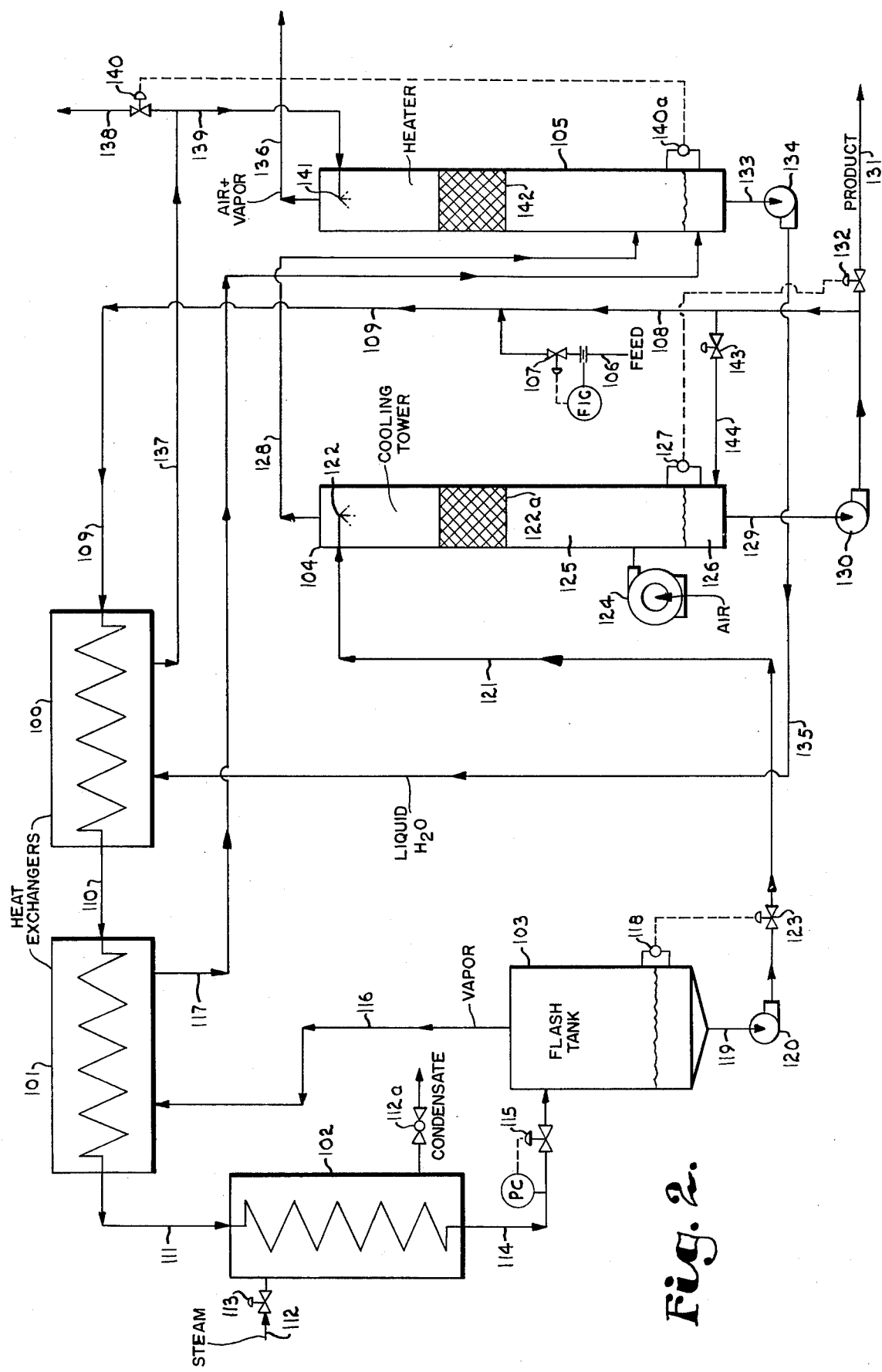
FIG. 2 is a schematic flow diagram of a process for concentrating solutions wherein the basic heat source for heating the solutions to be concentrated is low pressure steam.

FIG. 2 shows the improved solution concentrating process as applied to grain waste from a distillery having three percent solids in water. In the system of FIG. 1, utilizing high pressure steam, ¾ of the concentration is accomplished in the first three flash tanks, while the remaining evaporation was accomplished in the air blown cooler or cooling tower. In the instant system, there is but a single flash tank employed in which ¼ of the evaporating work is accomplished, the remaining ¾ being accomplished in the cooling tower.

Turning to a specific description of the process as applied in the specific embodiment of FIG. 2, there are three heating vessels 100, 101 and 102. Vessel 100 is a liquid-liquid heat exchanger, while vessels 101 and 102 are steam condensers. A flash tank is provided at 103 and an air blown cooler or cooling tower 104. Additionally, there is water heater 105.

New feed into the system is supplied through input line 106, this flow controlled by valve 107. The input into line 106 is at 130° F at 109 P.S.I.G. in a total quantity of 13,900 pounds per hour, of which 13,334 pounds are water and 556 pounds solids. Recycle line 108 from the cooling tower 104 carries liquid at 120° F, 109 P.S.I.G. in a quantity of 105,638 pounds per hour of which 78,172 pounds are water and 27,466 pounds are solids.

The combined flows of lines 106 and 108 meet in line 109 which passes to liquid-liquid heat exchanger 100. Immediately before passing into exchanger 100, the liquid in line 109 is at 122° F at 109 P.S.I.G. in a total quantity of 119,538 pounds per hour, of which 91,516 pounds are water and 28,022 pounds are solids.

Effluent line 110 passes these further heated fluids to steam condenser 101, from which exit line 111 further passes these further heated fluids to steam condenser 102. Steam input line 112, controlled by valve 113 passes steam at 250° F and 15 P.S.I.G. in the quantity of 5,762 pounds per hour into steam condenser 102 (low pressure steam).

The effluent feed from steam condenser 102 through exit line 114 passes through back pressure control valve 115 to the flash tank 103. Immediately prior to passing through back pressure valve 115, the feed is at a temperature of 238° F, at 20 P.S.I.G., the total flow 119,538 pounds per hour of which 91,516 pounds are water and 28,022 pounds solids.

In flash tank 103 there is a vapor-liquid separation with the overhead vapors passing off through line 116 to steam condenser 101. This overhead is at 212° F, 0 P.S.I.G. and in the quantity of 2,755 pounds per hour of water. This is the steam supply to condenser 101. The effluent steam from the condenser then is discharged through line 117 and passes therethrough to water heater 105.

Flash tank 103 has level control 118 mounted thereon coupled with control valve 123. Liquid bottoms from tank 103 pass via line 119 through pump 120 to cooling tower 104 through line 121.

The feed through line 121 to the distribution header 122 of cooling tower 104 is at 212° F at 15 P.S.I.G., the total liquid quantity 116,783 pounds per hour of which 88,761 pounds is water and 28,022 are solids.

Tower 104 is a typical counterflow, forced draft, blow through cooling tower having (optionally) fill or contact surfaces 122a below distribution header 122, propeller fan or centrifugal blower 124 discharging air into the plenum 125 below the fill and sump 126 below the air input. Level controller 127 controls the quantity of liquid in sump 126. Air input through fan 124 at 80° F and 6 inches of water is in the total quantity of 13,463 pounds per hour of which 13,314 pounds are dry air and 149 pounds water.

The overhead vapor discharge through line 128 is at 181° F and 4 inches of water in a total quantity of 22,470 pounds per hour of which 13,314 pounds is dry air and 9,156 pounds water. Line 128 passes to water heater 105. Liquid bottoms from cooling tower 104 are withdrawn through line 129 by pump 130 which discharges product through line 131 controlled by valve 132, as well as recycle through line 108 already described. The product in line 131 is at 120° F at 25 P.S.I.G., typically in a total quantity of 2,138 pounds per hour of which 1,582 pounds per hour are water and 556 pounds are solids. Thus the solids have been concentrated from approximately 3% to over 26% in the process described.

Turning to water heater 105, line 117 supplies water thereto from steam condenser 101 at 212° F. The overhead from the cooling tower through line 128 has previously been described. Water bottoms from heater 105 pass through line 133 driven by pump 134 then via line 135 as the heat exchanging medium for liquid-liquid heat exchanger 100. The contents of line 135 is water at 171° F at 35 P.S.I.G. in a quantity of 129,820 pounds per hour. The overhead vapor discharge from heater 105 is through line 136, this vapor at 168° F, in a total quantity of 18,638 pounds per hour, of which 13,314 pounds per hour are air and 5,324 pounds per hour are water. This may be vented to atmosphere or passed to an air cooler system, alternatively (not shown).

The effluent heat exchange water from exchanger 100 is taken off through line 137 which splits into lines 138 and 139. Line 138 passes to a drain controlled by valve 140 which is linked to level control 140a on water heater 105. Line 139 passes to the spray distribution header 141 in water heater 105 above fill or contact surface 142 thereof. This water in line 139 is at 140° F at 10 P.S.I.G. in a quantity of 125,988 pounds per hour.

FIG. 3

Figure 3:
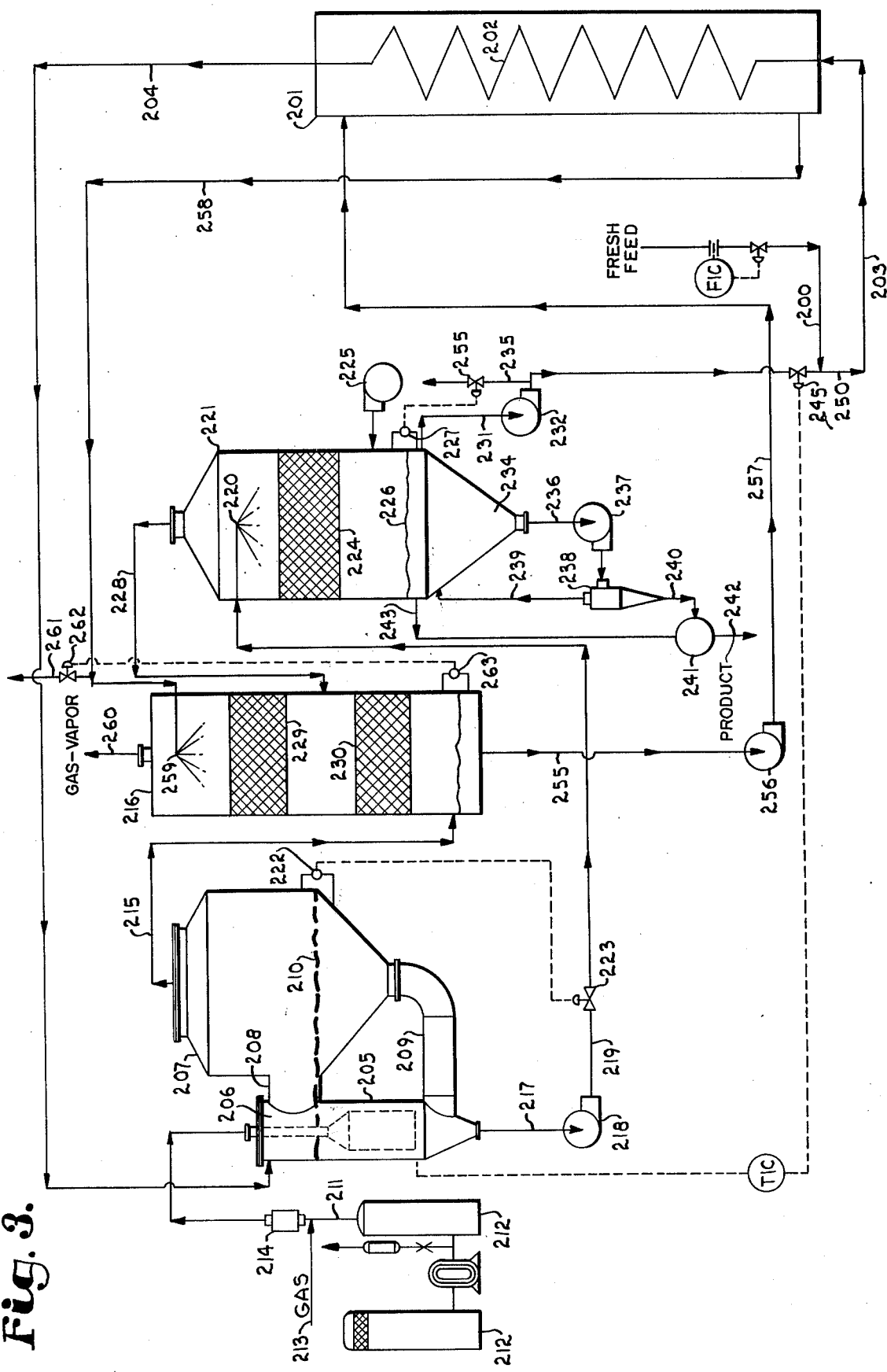
FIG. 3 is a schematic flow diagram of an improved process for concentrating liquids wherein the basic heat source for concentrating the solution is a submerged combustion burner.
Figure 4:
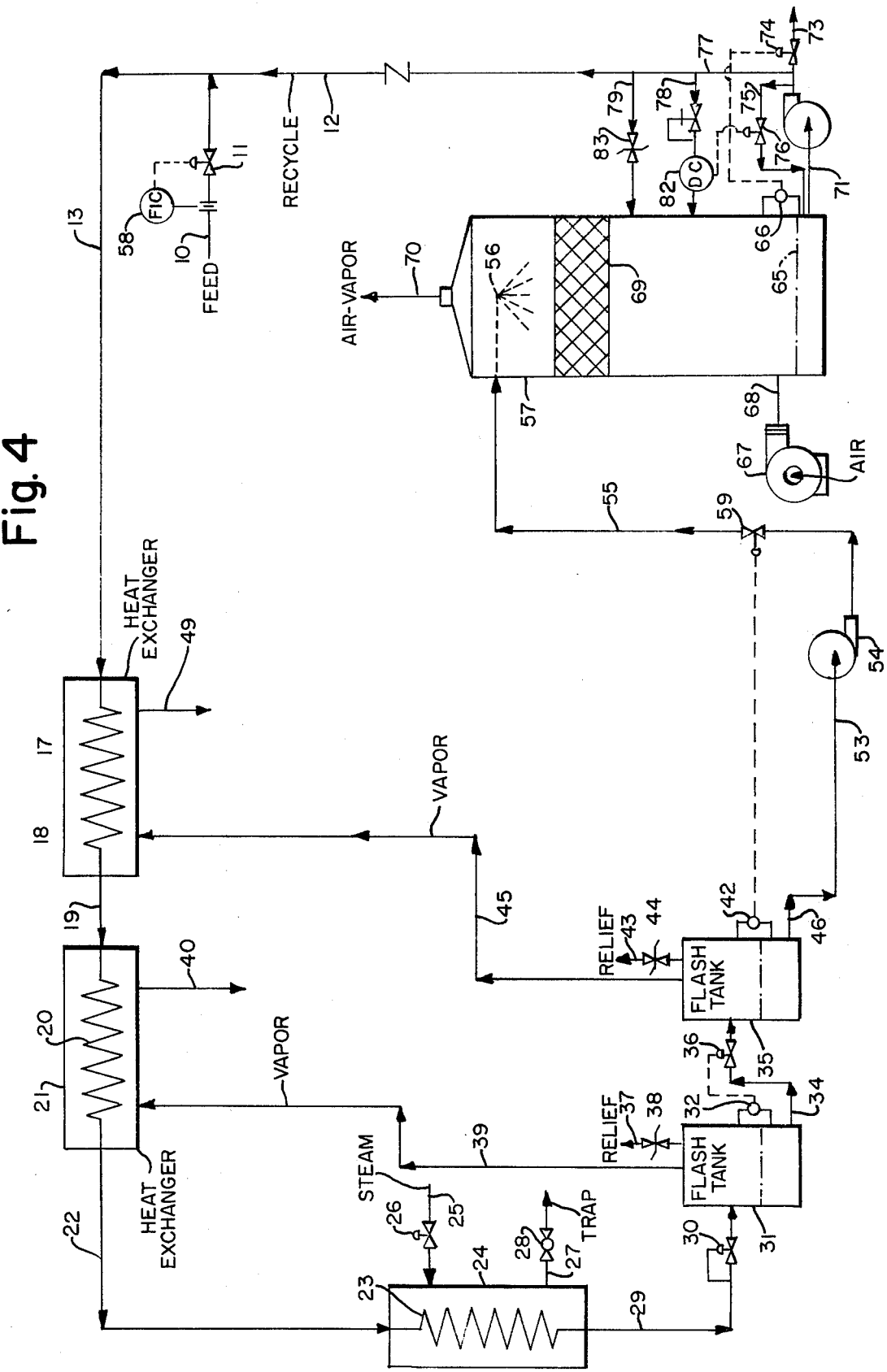
FIG. 4 is a schematic flow diagram of a process similar to that of FIG. 1 but with two flash evaporation stages. Corresponding elements are similarly numbered.

FIG. 3 illustrates the use of an air-blown cooler or cooling tower with a submerged combustion evaporator in concentration and evaporation. Fresh feed is input through line 200 and mixed with recycle at 125° F in line 250. A typical such feed would be 77,382 pounds per hour feed solution at 68° F. Line 203 passes into the heating coil 202 of heat exchanger 201 at 115° F. Effluent discharge line 204 passes then to the basic heating vessel 205 of a dual vessel evaporator system utilizing, in vessel 205, a submerged combustion burner 206 of conventional type. The combined heated solutions from lines 200 and 250, in the specific example quantity of 491,571 pounds per hour of solution at 170° F, comprise the feed to the evaporation system.

Associated with vessel 205 containing submerged combustion burner 206 is a large evaporator tank 207. An upper conduit 208 communicates between vessels 205 and 207, while a lower conduit 209 communicates between the lower ends of vessels 205 and 207. The liquid level in vessels 205 and 207 as indicated at 210 is controlled by level controller 222. With the burner operating in vessel 205, circulation between the vessels is clockwise in the view of FIG. 3, namely, from left to right through conduit 208, down in the conical lower portion of vessel 207 and from right to left in the conduit 209, upwardly into vessel 205 under the impetus of the heat applied to the liquid in vessel 205.

With respect to burner 206, air input line 211 is supplied by motor blower unit 212, while gas is supplied through line 213. The gas and air are mixed in mixer 214 and supplied to burner 205 to be burned as a combustible mixture below the surface of the liquid 210 in conventional fashion. Submerged combustion burners as seen in the patents to Doennecke, et al, Nos. 2,086,902 and 2,159,759, issued 7-13-37 and 5-23-39, respectively, may be employed or the improved burner of Application Ser. No. 253,541 filed 5-15-72, inventors Douglas, Young and Phillips for "Improved Method and Apparatus for Submerged Combustion".

The latter application also shows the operation of the two vessel evaporator system execplified by vessels 205 and 207 with the inter-communicating conduits 208 and 209 and burner 206.

Assuming 465 SCFM gas supplied in line 213, typically, overhead through line 215, 14,381 pounds per hour of water may be evaporated with 13,212 ACFM of gases and water vapor at 200° F. Line 215 passes to water heater 216 above the liquid level therein. Liquid bottoms are drawn off from the lower portion of vessel 207 through line 217 by pump 218 and then passes via line 219 to the liquid distribution header 220 in cooling tower 221. Valve 223 is employed to control the quantity of liquid passed to the cooling tower distribution header. Typically the liquid through line 219 would constitute 477,189 pounds per hour of solution at 200° F.

Air-blown cooler or cooling tower 221 is a forced draft, counterflow, blow-through cooling tower having contact surfaces or fill 224 below distribution header 220 and above centrifugal blower or propeller fan 225. The latter typically supplies 14,989 SCFM of air below fill 224. The heat exchanged liquid falls into sump 226, the level of liquid therein controlled by level controller 227.

Overhead through line 228 there passes 23,597 pounds per hour of water evaporated by 29,000 ACFM of air-water vapor at 180° F. Line 228 enters water heater 216 below a first stage of fill 229 therein but above a second fill stage 230 which is between the input of line 228 and the lower input of line 215 from vessel 207. Cooled, liquid bottoms are drawn off from sump 226 of cooling tower 221 through line 231 and through pump 232.

Settling tank 234 (built into cooling tower 221) and the apparatus accessory therewith are optional (employed if solids are in the system). Where there are no solids in the system, the effluent bottoms from cooling tower pump 226 pass via line 235 to the output from the system (typically 35,035 pounds per hour at 125° F). Bottoms from settling tank 234 pass via line 236 and pump 237 to a separator such as a liquid cyclone 238. The overhead from separator 238 is recycled via line 239 to tank 234. Bottoms from separator 238 are passed via line 240 to centrifuge 241. From centrifuge 241, product line 242 leads out of the system. In the typical specific example described, there is removed as solids 4,589 pounds per hour of sodium chloride and 112 pounds per hour of calcium sulfate ($CASO_4 \cdot 2H_2O$). Recycle line 243 from centrifuge 241 passes recycled solution to tank 234.

The liquid bottoms from heater 216 are drawn off in line 255 by pump 256 thereafter passing via line 257 to heat exchanger 201. In exchanger 201 this liquid passes in indirect heat exchange with the fluids in coil 202. The liquid effluent from exchanger 201 passes via line 258 to distributor head 259 in heater 216. This liquid passes in counterflow heat exchange with the vapor inputs from lines 215 and 228 from vessels 207 and 221. Vapor overhead from the exchanger 216 passes out line 260 to atmosphere. Line 261 from line 258 controlled by valve 262 linked with level control 263 passes liquid out of system.

To complete the cycle, the output of pump 232 is split between the product line 235 and the recycle 250 controlled by valve 245.

In the system of FIG. 3 being concentrated is $CaCl_2$. It contains NaCl impurities which precipitate out as a concentration of calcium chloride increases. The various concentrations are:

| | | |
|---|---|---|
| Feed 200 | 60,501 Lbs./hr. | $H_2O$ |
| | 10,621 Lbs./hr. | $CaCl_2$ |
| | 6,260 Lbs./hr. | NaCl |
| | 77,382 Lbs./hr. | Total |
| Line 217 | 304,645 Lbs./hr. | $H_2O$ |
| | 149,091 Lbs./hr. | $CaCl_2$ |
| | 23,453 Lbs./hr. | $NaCl_2$ |
| | 477,189 Lbs./hr. | Total |
| Line 236 | 4589 Lbs./hr. | NaCl solids |
| | 406 Lbs./hr. | NaCl in solution |
| | 2827 Lbs./hr. | $CaCl_2$ in solution |
| | 5289 Lbs./hr. | $H_2O$ |
| | 13,111 Lbs./hr. | Total Slurry |
| Line 231 | 281,338 Lbs./hr. | $H_2O$ |
| | 149,019 Lbs./hr. | $CaCl_2$ |
| | 18,867 Lbs./hr. | NaCl |
| | 449,224 Lbs./hr. | Total |

It should be understood that, while the liquid heating means illustrated and described in FIG. 3 is preferred, immersion heaters, indirect fired heaters and the heating of the liquid in vessel 205 by various indirect heat exchange or transfer media as well as submerged exhaust systems, may be employed.

Referring to the systems of FIGS. 1–3, inclusive, these comprise multiple effect evaporators. The process of FIG. 1 for high pressure steam is a process where evaporation is carried out in each of three flash tanks and the solution is further concentrated in the air blown cooler, and heat is recovered in each of the three heat exchanger. The process of FIG. 2 for 15 P.S.I.G. steam is a system where evaporation is carried out in the flash tank and air blown cooler and heat from the air and water vapor from the air blown cooler is recovered in the water heater. If lower pressure steam, say at 3 P.S.I.G. were used, the heat that could be recovered would not justify the use of the flash tank and heat exchanger 101. Without the flash tank and one of the heat exchangers, the system pf FIG. 2 would be less efficient. The process of FIG. 3 is a system where heat is recovered by condensing water vapor from both the submerged combustion evaporator and air blown cooler.

A settling tank would also be used in the systems of FIGS. 1 and 2 if solids are precipitated.

The use of the air blown cooler shown in the systems illustrated and described is a marked improvement over the vacuum systems used in multiple effect evaporators now on the market. Less energy and materials are required to install and operate a multiple effect evaporator with an air blown cooler than for a multiple effect vacuum evaporator. This is important in view of the current energy crisis and shortage of materials. A submerged combustion evaporator with a heat recovery system including an air blown cooler uses considerably less fuel and results in less air pollution than a single effect submerged combustion evaporator.

While heat is lost as water vapor with the overhead air from the cooling tower of FIG. 1, the process of FIG. 1 is more efficient than in FIGS. 2 and 3 because of the reuse of steam from the three flash tanks. A water heater may be used at this point to further increase the efficiency when using high pressure steam.

The material balance of FIGS. 3 shows 14,381 pounds per hour of water evaporated by submerged combustion and 23,597 pounds per hour from the air blown cooler. A single vessel submerged combustion evaporator could be used in place of the preferred double vessel seen at 205 and 207 in FIGS. 3.

The recycle is necessary for each type of system (high pressure, low pressure and submerged combustion) and must be used to recover the heat in sufficient quantities and cause the necessary evaporation. In fact, the evaporation rate is controlled by the amount of material being recycled. More evaporation requires more recycle and turning down the system requires lowering the recycle rate. While the feed concentration and temperature are raised after mixing with the recycle, it must be remembered that the recycle concentration and temperature are lowered after mixing with the feeds.

From the foregoing, it will be seen that this invention is one well adapted to attain all of the ends and objects hereinabove set forth together with other advantages which are obvious and which are inherent to the process.

It will be understood that certain process features, steps and sub-combinations thereof are of utility and may be employed without reference to other features, steps and process subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

We claim:

1. A process of concentrating a solution using steam as the basic heat source to heat the solution to be concentrated, comprising:

passing the solution to be concentrated through a series of three successive, temperature increasing, indirect heat exchanging steps to raise the temperature thereof, while maintaining the solution to be concentrated under sufficient back pressure to retain same in liquid form;

the first indirect heat exchanging step being a liquid-liquid heat exchanging step; the second and third indirect heat exchanging steps being vapor-liquid heat exchanging steps;

the heat exchanging medium to the third indirect heat exchanging step being steam;

passing the heated solution from said third indirect heat exchanging step to a flash evaporation step to separate same into liquid and vapor phases;

passing the vapor phase from said flash evaporation step in indirect heat exchange with the solution to be concentrated in the second one of said indirect heat exchanging steps;

passing the liquid phase from the flashing step to an evaporative cooling step wherein same is distributed in counterflow relationship with air in a cooling tower;

there being a water heater of counterflow, liquid-gas direct heat exchange type;

the feed to the water heater comprising the condensate from the second indirect heat exchanging step and the vapor overhead from the cooling tower, both being passed to the lower part of the water heater;

the heat exchanging medium to the first indirect heat exchanging step being the bottoms from the water heater;

the overhead liquid feed to the water heater being the liquid heat exchange medium effluent from the first indirect heat exchanging step;

passing a portion of the liquid bottoms from the cooling tower from the system as product, and recycling a portion of the liquid bottoms from the cooling tower into the new feed to maintain the evaporation rate and increase the concentration thereof.

2. A process as in claim 1 wherein the heat exchanging medium to the the third indirect heat exchanging step is realtively low pressure steam.

3. A process of concentrating a solution using steam as the basic heat source to heat the solution to be concentrated, comprising the steps of:

passing the solution to be concentrated through a series of at least three successive, temperature increasing, indirect heat exchanging steps to raise the temperature thereof, while holding the said solution under sufficient back pressure to maintain same in liquid form;

passing the heated solution to a first flash evaporation step to make a first separation of same into liquid and vapor phases;

passing the vapor phase from the first flash evaporation step in indirect heat exchange with the solution to be heated in the next to last solution heating step;

steam heating the last solution heating indirect heat exchanging step;

passing the once concentrated liquid phase from the first flash evaporation step to a second flash evaporation step to make a second separation of the heated solution into liquid and vapor phases;

passing the vapor phase from the second flash evaporation step in indirect heat exchanging relationship with the solution to be heated in the second from last solution heating step;

passing the twice concentrated liquid phase from the second flash evaporation step to a counterflow heat exchanger of the gas-liquid contact cooling tower type as the overhead liquid input thereto;

passing ambient air in counterflow direct heat exchanging relationship therein with said liquid to concentrate same a third time;

passing a portion of the thrice-concentrated liquid bottoms from the cooling tower sump out of the system as product, and recycling a portion of the cooling tower bottoms with the new solution to be concentrated to the heating steps therefor.

4. A process of concentrating a solution using steam as the basic heat source to heat the solution to be concentrated, comprising the steps of:

passing the solution to be concentrated through a series of at least three successive, temperature increasing, indirect heat exchanging steps to raise the temperature thereof, while holding the said solution under sufficient back pressure to maintain same in liquid form;

passing the heated solution to a first flash evaporation step to make a first separation of same into liquid and vapor phases;

passing the vapor phase from the first flash evaporating step in indirect heat exchange with the solution to be heated in the next to the last solution indirect heating step;

steam heating the last solution indirect heating step;

passing the once concentrated liquid phase from the first flash evaporation step to a second flash evaporation step to make a second separation of the heated solution into vapor and liquid phases;

passing the vapor phase from the second flash evaporation step in indirect heat exchanging relationship with the solution to be heated in the second from last solution indirect heating step;

passing the twice-concentrated liquid phase from the second flash evaporation step to a third flash evaporation step to make a third separation of the heated solution into liquid and vapor phases;

passing the vapor phase from the third flash evaporation step in indirect heat exchanging relationship with the solution to be heated in the third from last solution indirect heating step;

passing the thrice concentrated liquid phase from the third flash evaporation step to a counterflow heat exchanger of the gas-liquid contact cooling tower type as the overhead liquid input thereto;

passing ambient air in counterflow direct heat exchanging relationship in said cooling tower with said liquid to concentrate same a fourth time;

passing a portion of the four times concentrated liquid bottoms from the cooling tower sump out of the system as product, and recycling a portion of the cooling tower bottoms with the new solution to be concentrated to the heating steps therefore.

5. A process as in claim 4 wherein the effluent heat exchanging medium from the next to last and second to last heat exchanging steps are passed to a vapor-liquid separating step;

the vapor phase from the vapor-liquid separating step is joined with the vapor phase from the third flash evaporating step and passed in indirect heat exchanging relationship with the solution to be concentrated in the third from last heat exchanging step thereof, and the condensate from the said vapor-liquid separating step is passed out of the system.

* * * * *